July 17, 1973 D. J. PETRANEK Re. 27,702
DUAL POWERED REFRIGERATION SYSTEM
Original Filed Oct. 14, 1968
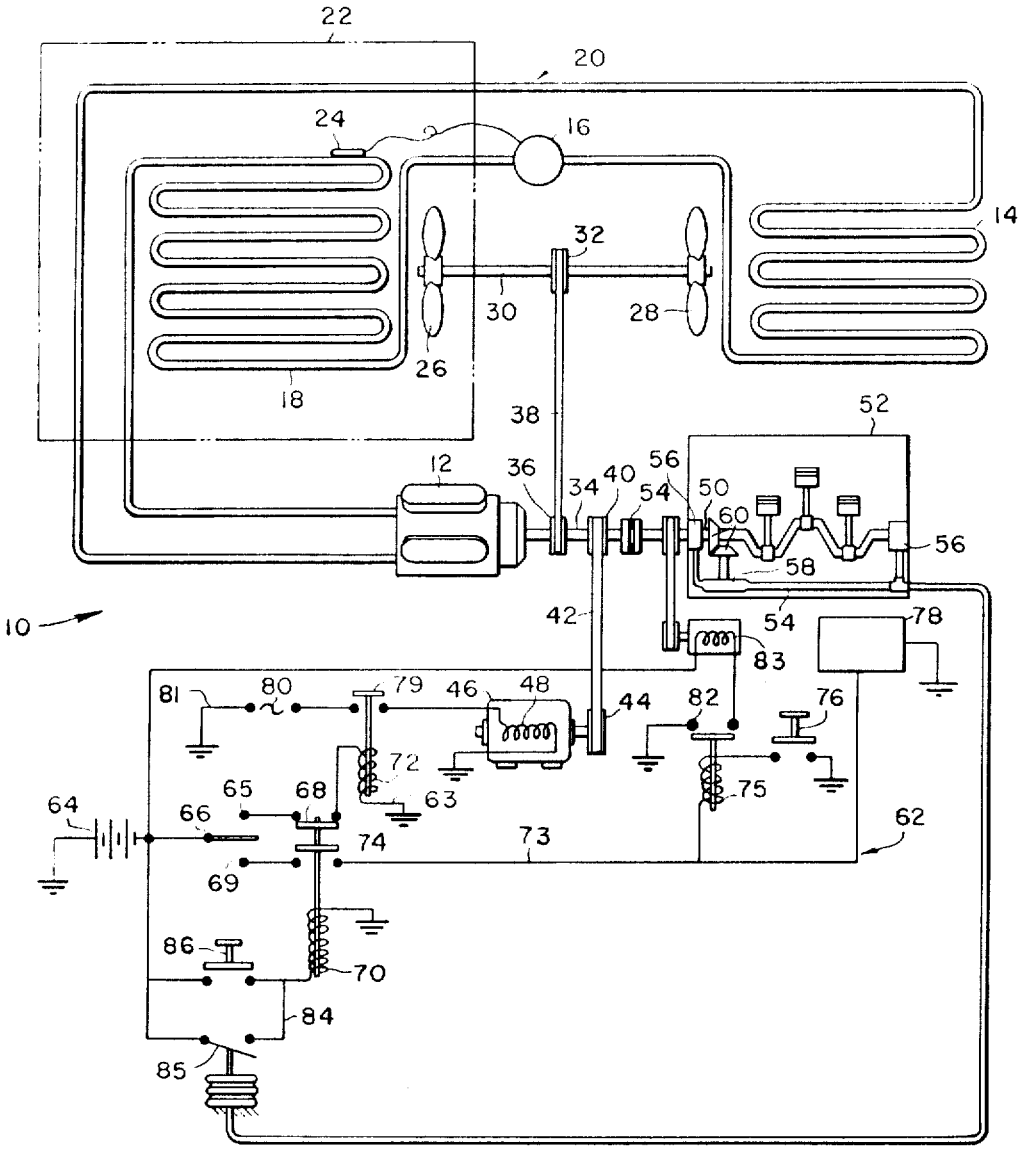
INVENTOR.
DAVID J. PETRANEK
BY
Carl M. Lewis
ATTORNEY United States Patent Office Re. 27,702
Reissued July 17, 1973

27,702
DUAL POWERED REFRIGERATION SYSTEM

David J. Petranek, La Crosse, Wis., assignor to The Trane Company, La Crosse, Wis.

Original No. 3,545,222, dated Dec. 8, 1970, Ser. No. 767,260, Oct. 14, 1968. Application for reissue May 10, 1971, Ser. No. 141,510
Int. Cl. F25b *27/00*
U.S. Cl. 62—236 11 Claims

Matter enclosed in heavy brackets [ ] appears in the original patent but forms no part of this reissue specification; matter printed in italics indicates the additions made by reissue.

ABSTRACT OF THE DISCLOSURE

A refrigeration system of the vapor compression type alternatively driven by an engine or an electric standby motor in which means is provided to prevent the standby motor from driving the refrigeration compressor and fans until after the engine has been drivingly disengaged from the compressor and fans.

This invention relates to vapor compression refrigeration apparatus and particularly to refrigeration apparatus used in transportation of goods such as by refrigerated truck or container wherein a combustion engine and a standby electric motor are alternatively used to drive the refrigeration system compressor and/or the evaporator or condenser fans.

An object of this invention is to provide a means to prevent any damage that might be caused the refrigeration system as a result of energizing the standby motor while it is simultaneously connected in driving relation with the combustion engine. Damages that may otherwise occur include: damage to the mechanical drive, damage to the motor contactor, burned motor windings, as well as burnout of associated fuses.

Another object of my invention is to provide a delay between the time of shutting down the engine and the time the standby motor is started to permit the refrigeration system pressures to partially equalize whereby the compressor may be started with a lower starting torque.

Specifically this invention involves a self-powered refrigeration unit adapted for cooling a space comprising: a refrigerant evaporator disposed in heat exchange relation with said space, a refrigerant compressor, a refrigerant condenser, and a refrigerant throttling means serially connected in a closed refrigerant circuit; an engine; a standby electric motor; first means drivingly connecting said motor to said compressor; second means drivingly connecting said engine to said compressor; said second means including a speed responsive clutch means for drivingly disengaging said engine from said compressor in response to an engine speed below a predetermined value; and power control means for controlling the operation of said engine and motor including engine speed responsive means for precluding substantial energization of said motor in response to a condition responsive to operation of said engine at a speed above said predetermined value.

Other objects and advantages will become apparent as this specification proceeds to describe the invention in reference to the accompanying drawing in which the sole figure schematically illustrates the invention.

Referring now to the drawing, refrigeration system 10 includes a refrigerant compressor 12, a refrigerant condenser 14, a refrigerant throttling means such as temperature responsive expansion valve 16, and evaporator 18 connected in a closed refrigerant circuit 20. Expansion valve 16 throttles refrigerant into evaporator 18 where it is caused to evaporate by heat absorbed from space 22.

The amount of refrigerant delivered to the evaporator is controlled by the superheat condition of the evaporator outlet as measured by temperature sensing bulb 24. The heat transfer between the air in space 22 and evaporator 18 is improved by circulating the air of space 22 over the evaporator 18 with fan 26.

The evaporated refrigerant passes through refrigerant circuit 20 to compressor 12 from whence it is delivered at high pressure to condenser 14. Ambient or atmospheric air is blown over the condenser by fan 28 causing the refrigerant to be cooled and condensed whereupon the refrigerant condensate is again returned to valve 16 to be throttled into the evaporator.

Fans 26 and 28 are drivingly connected to a common fan shaft 30. Fan shaft 30 has a sheave 32 drivingly connected thereto whereby rotation of the sheave causes fans 26 and 28 to rotate. The drive shaft 34 of compressor 12 also has a sheave 36 drivingly connected thereto. Sheaves 32 and 36 are drivingly connected by a flexible drive belt 38 whereby compressor 12 and fans 26 and 28 may be rotatably driven by drive shaft 34.

Shaft 34 has drivingly mounted thereon a second sheave 40 which is drivingly connected via a second drive belt 42 to a fourth sheave 44 drivingly connected to the shaft of standby electric motor 46. For standby operation, windings 48 of motor 46 are energized thereby causing motor 46 to drive compressor 12 and fans 26 and 28 via sheave 44, belt 42, sheave 40, shaft 34, sheave 36, belt 38, sheave 32, and shaft 30.

Shaft 34 is also arranged to be driven from the crankshaft 50 of an internal combustion engine 52. Crankshaft 50 and shaft 34 are drivingly interconnected via a centrifugal clutch 54. Clutch 54 is responsive to the speed of shaft 50 and arranged to drivingly disconnect shaft 50 from shaft 34 at crankshaft speeds below a predetermined value such as for example 40 revolutions per minute. For purposes of illustration engine 52 is shown as having a lubrication system 54 for delivering lubricant from the crankcase to the crankshaft bearings 56. A lubricant pump 58 driven from crankshaft 50 via gears 60 provides the necessary oil pressure for lubrication system 54. It will be understood that this oil pressure falls to zero when engine 52 is not in operation.

In order that the refrigeration system may be driven, either by engine 52 or by standby motor 12, refrigeration system 10 has control system 62 which provides for an interlock whereby the standby motor 12 cannot be started until engine 52 has slowed sufficiently to insure that clutch 54 has been disengaged whereby no damage can be done to motor 46 and associated drive which may otherwise occur if the engine were permitted to remain coupled to and driven by motor 12.

Control system 62 includes a first electric circuit 63 for controlling operation of motor 46 which includes a control circuit power source such as battery 64, the "motor run" terminal 65 of manual selector switch 66, first switch 68 of relay 70, and relay 72. Energization of first electric circuit 63 operatively connects motor 46 to a source of power as will hereinafter be described.

Control system 62 also includes a second electric circuit 73 for controlling operation of engine 52 which includes control circuit power source 64, the "engine run" terminal 69 of selector switch 66, second switch 74, and the engine electrical systems including engine starting system which has solenoid 75 and starting switch 76 and engine ignition system as diagrammatically illustrated at 78. The engine ignition system may include the usual ignition coil, points, distributor, etc.

Manual selector switch 66 is shown in the intermediate position whereby neither of circuit 63 nor circuit 73 is energized. However, if switch 66 is placed in the "motor run" position, i.e. completing the circuit with terminal 65, and if switch 68 is closed, it will be seen that a circuit including power source 64 and relay 72 is completed whereby relay 72 is energized to close its contacts 79. Closure of contacts 79 connects standby electric power source 80 via of motor power circuit 81 to the winding 48 of motor 46 whereby motor 46 is operated. However, if for any reason switch 68 remains open, relay 72 remains deenergized, and contact 79 remains open whereby circuit 81 cannot energize motor 46.

Now if the manual selector switch 66 is placed in the "engine run" position, i.e. completing the circuit with terminal 69, and if switch 74 is closed, a circuit is completed connecting power source 64 to the engine ignition system. Upon momentary closure of switch 76, a circuit is momentarily completed connecting power source 64 to starting solenoid 75 whereby solenoid contactors 82 are closed momentarily for completing a starting circuit including power source 64 and engine starter 83 whereby engine 52 is started. The engine will continue to run as long as switch 74 is closed and switch 66 is in the engine run position.

The positions of switches 68 and 74 are controlled by relay 70 in such a manner that switch 68 is normally closed and switch 74 normally open when relay 70 is deenergized and that switch 68 is open and switch 74 closed when relay 70 is energized.

Relay 70 is disposed in a third electric circuit 84 including power source 64 and pressure responsive switch 85. Pressure responsive switch 85 is connected to be responsive to the lubricant pressure of the lubrication system 54 and set to open in response to a lubricant pressure corresponding to an engine speed below that at which centrifugal clutch 54 is engaged and to close at a lubricant pressure corresponding to an engine speed above that at which centrifugal clutch 54 is engaged. At startup of engine 52 it will be understood that the engine oil pressure initially is zero and pressure switch 85 is open and unable to complete the circuit to energize relay 70 to close switch 74 for operation of the engine. To permit relay 70 to be energized during engine startup for closing switch 74, I have provided a momentary shunt switch 86 in parallel relation to switch 85. Thus, momentary closure of switch 85 energizes relay 70 thereby closing second switch 74 to complete the second electric circuit for engine operation. Once the engine has reached sufficient speed to develop sufficient lubricant pressure to close switch 85, switch 86 may be opened and switch 85 will continue to hold relay 70 in the energized position.

Now, should the operator rapidly shift the manual selector switch 66 from the "engine run" position involving contact 69 to the "motor run" position involving contact 65, motor 46 will not be started until centrifugal clutch 54 is disengaged whereby motor 46 cannot be engaged with drive engine 52. This is accomplished by reason of the fact that pressure responsive switch 85 is set to open at an engine lubricant pressure below that corresponding to an engine speed at which clutch 54 will remain engaged. Since relay 70 remains energized until after clutch 54 is disengaged, switch 68 will remain open until after clutch 54 is disengaged thereby precluding starting of the standby motor until after clutch 54 is disengaged.

It will also be seen that the resulting delay, following the movement of selector switch 66 from the engine operating position to the motor operating position prior to actual starting of the motor, in many cases will permit the refrigerant pressures in the refrigerant circuit 20 to equalize thereby permitting the compressor to be started with lower torque on the standby motor.

Having now described the preferred embodiment of my invention, I contemplate that many changes may be made without departing from the scope or spirit of my invention, and I accordingly desire to be limited only by the claims.

I claim:

1. A self-powered refrigeration unit adapted for cooling a space comprising: a refrigerant evaporator disposed in heat exchange relation with said space, a refrigerant compressor, a refrigerant condenser, and a refrigerant throttling means serially connected in a closed refrigerant circuit; an engine; a standby electric motor; first means drivingly connecting said motor to said compressor; second means drivingly connecting said engine to said compressor; said second means including a speed responsive clutch means for drivingly disengaging said engine from said compressor in response to an engine speed below a predetermined value; and power control means controlling the operation of said engine and motor including engine speed responsive means for precluding substantial energization of said motor in response to a condition responsive to operation of said engine at a speed above said predetermined value.

2. The apparatus as defined by claim 1 wherein said first means maintains said compressor and said motor in driving relation despite operation of said engine at a speed above said predetermined value.

3. The apparatus as defined by claim 1 including first fan means for passing atmospheric air in heat exchange relation with said condenser; second fan means for circulating air from said space in heat exchange relation with said evaporator; and means drivingly coupling at least one of said fan means with said compressor whereby said one fan means is drivingly connected to said engine via said speed responsive clutch means.

4. The apparatus as defined by claim 1 wherein said speed responsive clutch is a centrifugal clutch.

5. The apparatus as defined by claim 1 wherein said engine includes a lubrication system having a lubricant pump driven by said engine; and wherein said engine speed responsive means includes a pressure responsive means responsive to the lubricant pressure of said lubrication system for maintaining said motor substantially deenergized in response to a lubricant pressure corresponding to an engine speed above said predetermined value.

6. The apparatus as defined by claim 1 wherein said power control means includes a first electric circuit means for operating said motor, a second electric circuit means for operating said engine, and a selector switch for selectively energizing said first and second electric circuit means; a first switch means disposed in said first electric circuit means for interrupting said first circuit means; and a second switch means disposed in said second circuit means for interrupting said second circuit means; and wherein said engine speed responsive means controls operation of said first switch means.

7. The apparatus as defined by claim 6 wherein said engine speed responsive means additionally controls operation of said second switch means.

8. The apparatus as defined by claim 7 wherein said engine includes a lubrication system having a lubricant pump driven by said engine; and wherein said engine speed responsive means includes electric actuator means for actuating said first and second switch means; a third electric circuit means for energizing said electric actuator means; a pressure responsive switch means responsive to the lubricant pressure of said engine lubrication system for controlling energization of said electric actuator means to actuate said first and second switch means to positions for energizing said motor and for deactivating said engine in response to a lubricant pressure corresponding to an engine speed below said predetermined value and for substantially deenergizing said motor and for operating said engine in response to a lubricant pressure corresponding to an engine speed above said predetermined value; and means for momentarily overriding said pressure responsive switch means to permit starting of said engine when the lubricant pressure is below that corresponding to an engine speed above said predetermined value.

9. The apparatus as defined by claim 8 wherein said pressure responsive switch means is in series with said electric actuator means and said overriding means includes a third switch means arranged in parallel with said pressure responsive switch means.

10. The apparatus as defined by claim 6 wherein said first electric circuit means includes a power relay having its contacts arranged in series with said motor.

*11. In a refrigeration system of a type adapted to be mounted to a vehicle for cooling a commodity space thereof, apparatus comprising a compressor having an input drive shaft, a prime mover for driving the compressor and having an output shaft adapted to be coupled to drive the input shaft, centrifugal clutch means serving to intercouple said input and output shafts in response to operation of said output shaft above a predetermined minimum speed, a fan adapted to be associated with a refrigeration unit for providing an air stream thereto, a belt drive power take-off coupled to drive said fan and interposed between said compressor and said prime mover and operated in response to coupling of said shafts, auxiliary electric motor means for driving said compressor, and an electric circuit responsive to operation of said prime mover under conditions providing said predetermined minimum speed to electrically disable said motor.*

References Cited

The following references, cited by the Examiner, are of record in the patented file of this patent or the original patent.

UNITED STATES PATENTS

| | | | |
|---|---|---|---|
| 1,943,317 | 1/1934 | Hulse | 62—236 |
| 2,150,276 | 3/1939 | Gorman | 62—236 |
| 2,251,376 | 8/1941 | Ross | 62—323 |
| 2,284,914 | 6/1942 | Dmeler | 62—215 |
| 2,341,781 | 2/1944 | Hornaday | 62—323 |
| 2,962,873 | 12/1960 | Anderson | 62—236 |

WILLIAM J. WYE, Primary Examiner

U.S. Cl. X.R.

62—133, 134, 215, 323